US012241139B2

(12) United States Patent
Fröhlich et al.

(10) Patent No.: US 12,241,139 B2
(45) Date of Patent: Mar. 4, 2025

(54) METHOD FOR MANUFACTURING AN AUSTENITIC STEEL COMPONENT AND USE OF THE COMPONENT

(71) Applicant: Outokumpu Oyj, Helsinki (FI)

(72) Inventors: Thomas Fröhlich, Ratingen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 296 days.

(21) Appl. No.: 15/771,627

(22) PCT Filed: Nov. 9, 2016

(86) PCT No.: PCT/EP2016/077128
§ 371 (c)(1),
(2) Date: Apr. 27, 2018

(87) PCT Pub. No.: WO2017/081072
PCT Pub. Date: May 18, 2017

(65) Prior Publication Data
US 2018/0334735 A1   Nov. 22, 2018

(30) Foreign Application Priority Data

Nov. 9, 2015 (EP) .................................. 15193575

(51) Int. Cl.
*C21D 9/46* (2006.01)
*C21D 1/18* (2006.01)
(Continued)

(52) U.S. Cl.
CPC ............. *C21D 9/525* (2013.01); *C21D 1/18* (2013.01); *C21D 6/004* (2013.01); *C21D 8/0205* (2013.01);
(Continued)

(58) Field of Classification Search
CPC ........................................................ C21D 9/46
See application file for complete search history.

(56) References Cited

U.S. PATENT DOCUMENTS

| 10,066,280 B2 | 9/2018 | Ferraiuolo |
| 2004/0129355 A1* | 7/2004 | Hower ............... C21D 8/02 148/639 |

(Continued)

FOREIGN PATENT DOCUMENTS

| CN | 102312158 A | 1/2012 |
| CN | 103556052 A | 2/2014 |

(Continued)

OTHER PUBLICATIONS

English machine translation of DE 10 2013 108 163 A1 of Lackman (Year: 2015).*

(Continued)

*Primary Examiner* — Jophy S. Koshy
(74) *Attorney, Agent, or Firm* — The Webb Law Firm

(57) ABSTRACT

A method for manufacturing a component with high work hardening rate made of a material having an austenitic microstructure. A cold work hardened material for a component is heat treated to create at least one softened area with high ductility and lower strength than the initial high strength material by heat treating a part of the component material required for the softened area. Also, a use of the component.

15 Claims, 2 Drawing Sheets

(51) Int. Cl.
  *C21D 6/00* (2006.01)
  *C21D 8/02* (2006.01)
  *C21D 8/06* (2006.01)
  *C21D 9/52* (2006.01)
  *C22C 38/00* (2006.01)
  *C22C 38/58* (2006.01)
  *C21D 1/40* (2006.01)
  *C21D 1/42* (2006.01)

(52) U.S. Cl.
  CPC ........... *C21D 8/0247* (2013.01); *C21D 8/065* (2013.01); *C21D 9/46* (2013.01); *C22C 38/001* (2013.01); *C22C 38/58* (2013.01); *C21D 1/40* (2013.01); *C21D 1/42* (2013.01); *C21D 2211/001* (2013.01); *C21D 2211/005* (2013.01)

(56) References Cited

U.S. PATENT DOCUMENTS

| | | | |
|---|---|---|---|
| 2008/0247902 A1* | 10/2008 | Scheller | C22C 38/06 420/93 |
| 2010/0051146 A1 | 3/2010 | Park et al. | |
| 2012/0006089 A1 | 1/2012 | Pohl et al. | |
| 2013/0048150 A1 | 2/2013 | John et al. | |
| 2013/0125607 A1 | 5/2013 | Samek et al. | |
| 2015/0047753 A1 | 2/2015 | Luther et al. | |
| 2016/0122839 A1 | 5/2016 | Evertz et al. | |

FOREIGN PATENT DOCUMENTS

| | | |
|---|---|---|
| DE | 102008027460 A | 12/2009 |
| DE | 102013108163 A1 | 2/2015 |
| EP | 2264193 A1 | 12/2010 |
| EP | 2649214 A2 | 10/2013 |
| KR | 20100009222 A | 1/2010 |
| KR | 20100028310 A | 3/2010 |
| WO | 2014097184 A2 | 6/2014 |
| WO | 2014180456 A1 | 11/2014 |

OTHER PUBLICATIONS

L.W. Tsay, Y.C. Liu, D.Y. Lin, M.C. Young, The use of laser surface-annealed treatment to retard fatigue crack growth of austenitic stainless steel, Mat Sci Eng A, 8 (2004), pp. 177-183. (Year: 2004).*
Niendorf et al., "The Deformation Behavior of Functionally Graded TWIP Steel Under Monotonic Loading at Ambient Temperature," Materials Research Letters, 2003, pp. 96-101, vol. 1, No. 2.
Spiekermann, "Alloys—A Special Problem of Patent Law," Mitteilungen Der Deutschen Patentanwälte, 1993, pp. 178-190. (Relevant for the reasons stated in the International Search Report.).

\* cited by examiner

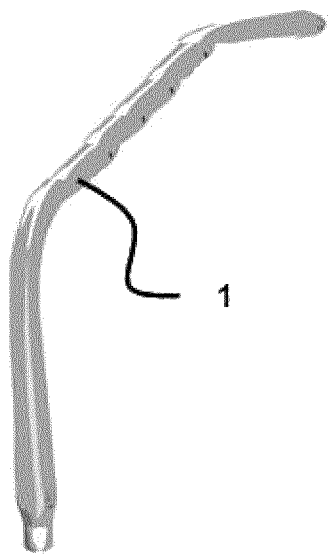
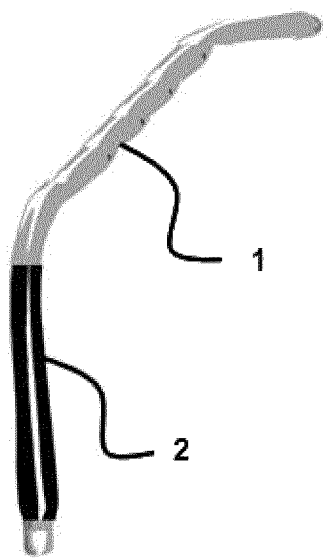
Fig. 3    Fig. 4
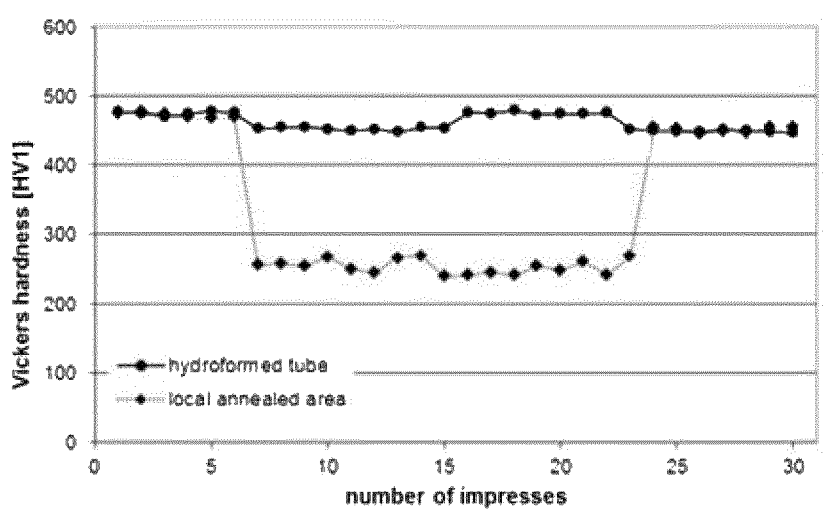
Fig. 5

METHOD FOR MANUFACTURING AN AUSTENITIC STEEL COMPONENT AND USE OF THE COMPONENT

CROSS-REFERENCE TO RELATED APPLICATIONS

This application is the United States national phase of International Application No. PCT/EP2016/077128 filed Nov. 9, 2016, and claims priority to European Patent Application No. 15193575.6 filed Nov. 9, 2015, the disclosures of which are hereby incorporated in their entirety by reference.

BACKGROUND OF THE INVENTION

Field of the Invention

The present invention relates to a method for manufacturing a component with high work hardening rate and to the use of the component especially in the automotive, car and truck industry.

Description of Related Art

In transport system manufacturing, especially automotive car body manufacturing, soft areas are needed beside high strength parts. The softer and more ductile materials have benefits during manufacturing the components by forming like lower springback, lower tool wear and reaching higher forming levels when complex parts are needed. Benefits during lifetime of component with a ductile material are a better fatigue behavior, lower crack growth affinity and a better energy absorption when compared with high strength steels.

But the ductile materials do not fulfil the strength levels which are required to reach the safety standards and the required car body stiffness. Lower strength materials have to manufacture with higher thicknesses which make them more cost-intensive, and which increase the weight of the car body and thereby increase the $CO_2$-emissions and mileage.

The European publication EP 2264193 A1 and the US publication US 2012/0006089 A1 describe the so-called tailored-tempering during a hot-forming process with tempered areas of a press hardening tool. Accordingly, the ferritic/martensitic microstructure of a 22MnB5 steel is modified during a modified hot-forming process by preventing locally an (complete) austenitization. The German publication DE 102008027460 A1 describes a hot-forming/press-hardening process to make a hardening with the initial material which can be a 22MnB5 steel or a TWIP steel or a TRIP steel. The way for influencing to the hardening level is a special heating up and temperature level.

The US publication US 2015/0047753 A1 relates to a method for the production of a component from ductile steel, where a strip or metal sheet is austenitized and quenched to produce an at least partly martensitic transformation microstructure and further heated to a forming temperature below the Ac1 transformation temperature, while maintaining the at least partly martensitic transformation microstructure in order to formed the material at the forming temperature below the Ac1 transformation temperature. Further, the treated material is coated with a metallic coating.

The US publication US 2013/0048150 A1 describes a method for producing a workpiece having properties which are adjustable across a wall or a strip thickness by a special decarburizing annealing process, using the TRIP hardening effect of a high-manganese alloyed steel.

The international publication WO 2014/180456 A1 describes a method for producing with only one material, austenitic lightweight construction steel, a component which has different material properties. The core is reached by a specific forming, where the austenitic lightweight construction steel has a temperature-dependent transformation induced plasticity (TRIP) and/or twinning induced plasticity effect (TWIP) during transformation The component is made to obtain high toughness during a temperature 40-160° C. above the room temperature and to obtain high strength during the temperature −65° C. to 0° C. below the room temperature. A cryogenic treatment is described also in the US publication US 2014/0328715 A1 in a method for producing a TWIP and nano twinned austenitic stainless steel containing less than 0.018 weight % C, 0.25-0.75 weight % Si, 1.5-2 weight % Mn, 17.80-19.60 weight % Cr, 24.00-25.25 weight % Ni, 3.75-4.85 weight % Mo, 1.26-2.78 weight % Cu, 0.04-0.15 weight % N the rest being Fe and unavoidable impurities.

The TWIP (Twinning-Induced Plasticity) effect depends on the chemical composition, austenitic microstructure hardening effect and the stacking fault energy (20-30 $mJ/m^2$). In the TWIP effect a large amount of deformation is driven by the formation of deformation twins. The twinning causes a high value of instantaneous hardening rate when the microstructure becomes finer and finer. The resultant twin boundaries act like grain boundaries and strengthen the steel. The hardening rate value increases to a value of 0.4 at an approximate engineering strain of 30% and then remains constant until both the uniform elongation and the total elongation reach 50%.

The method for manufacturing of steel grades having the TWIP effect with different chemical compositions is also described for instance in the Chinese publication CN 103556052 A, in the Chinese publication CN 102312158 A, in the European publication EP 2649214 A2, in the Korean publication KR 20100028310 A and in the Korean publication KR 20100009222 A.

The international publication WO 2014/097184 A2 relates to a use of the austenitic stainless steel with TWIP effect containing in weight % 0.01-0.50% C, 0.001-0.5% Si, 6-12% Mn, 11-20% Cr, 0.01-6.0% Ni, 0.01-2.0% Mo, 0.01-2.0 Co, 0.01-6.0% Cu, 0.11-0.50% N, 0.001-0.5% Nb, 0.001-2.0% Al, the rest being Fe and unavoidable impurities, for manufacturing automobile components with complex geometry for energy absorption, structural reinforcements and/or applications by deep drawing wherein corrosion resistance is requested.

The prior art is concentrated to describe how to produce or manufacture a steel with a TWIP hardening effect and what is their specific chemical analysis for the steel. Even though the international publication WO 2014/097184 A2 just mentions the use of the steel for automotive components, the international publication WO 2014/097184 A2 does not describe how the components are manufactured.

The object of the present invention is to eliminate drawbacks of the prior art and to achieve an improved method for manufacturing a component with high work hardening rate and its use especially in the automotive, car and truck industry.

SUMMARY OF THE INVENTION

According to the invention the material in the method for manufacturing a component is a steel with an austenitic microstructure and with a TWIP (Twinning Induced Plasticity), TRIP/TWIP or TRIP (Transformation Induced Plasticity) hardening effect. Further, the material according to the invention is a steel which fulfils the microstructure effect and which has been specific cold work hardened during the manufacturing of the steel. In the manufacturing method of a component the starting material is in the shape of a sheet, coil, panel, plate, tube, profile, rivet or wire, and according to the invention the material is heat treated to create at least one softened area with high ductility and lower strength than the initial high strength material by heat treating the part of the component material required for the softened area at the temperature range 800-1250° C., preferably 900-1150° C.

The steel to be used as the material in the method of the invention has the defined stacking fault energy between 20-30 mJ/m$^2$ which makes the desired effect reversible under retention of stable full austenitic microstructure. According to the invention a steel with a TWIP hardening effect has the manganese content 10-25 weight %, preferably 15-20 weight %, and a metastable austenitic stainless steel which fulfils the TRIP microstructure effect has the nickel content: 4.0-9.5 weight %, preferably 4.5-6.5 weight %, and further, a steel which fulfils the TWIP microstructure effect is defined alloyed with interstitial disengaged nitrogen and carbon atoms with a sum (C+N) content: 0.4-0.8 weight %.

In the TWIP effect a large amount of deformation is driven by the formation of deformation twins. The twinning causes a high value of instantaneous hardening rate when the microstructure becomes finer and finer. The resultant twin boundaries act like grain boundaries and strengthen the steel. The hardening rate value increases to a value of 0.4 at an approximate engineering strain of 30% and then remains constant until both the uniform elongation and the total elongation reach 50%. The TRIP effect refers to the transformation of metastable retained austenite to martensite during plastic deformation as a result of imposed stress or strain. This property allows stainless steels having the TRIP effect to have a high formability, while retaining excellent strength. By means of the heat treating step carried out by for instance by annealing according to the present invention annealed areas are created in the component in order to remove twins from the microstructure of the steel in the annealed areas. Thus annealed areas are softened areas with high ductility and lower strength and hardness than the initial high strength material.

The annealing according to the invention can be carried out during a forming process of the material to a desired shape when a heated forming tool is used. The annealing according to the invention can for instance be combined with a subsequent cathodic dip coating hardening in a furnace at the temperature range of 180-220° C. The annealing when manufacturing the component can be carried out also between two forming steps in which case areas softened by annealing are again formed. Multi-forming with the annealing step are used for very complex components as well as for thin components having a thickness of less than 0.6 mm. Further, the annealing according to the invention can be realized in connection with welding by a resistance, beam or arc welding process, by inductive heating as well as by conductive heating with current conduction, in a heat treatment furnace during press hardening or during laser or electron beam machining of the component.

When using the method of the invention in manufacturing of a component it is reduced springback during the forming process as well as tool wear is reduced during the forming process because of the reduced yield strength. Further, an additional drawback of cold hardened austenitic TWIP steels with their ultra high strength can be solved with the method of the invention. With the annealing of local areas, the twin density in these areas of TWIP steels declines, and then also the strength declines. This makes possible to use the method for manufactruing of a component according to the invention so that with the combination of a local annealing and after that a "break-trough" process like drilling, clinching, riveting or stamping.

The component manufactured by the method of the invention has improved properties, such an increased fatigue behavior, a decreased crack growth affinity, an increased energy absorption potential, a designed local areas with higher intrusion level and a control of the component intrusion and designed specific weak points in the component. The component manufactured according to the invention thus combines the benefits of high strength steel with the benefits of softer and more ductile material by annealing at least partly a component made of high strength austenitic steel.

The component manufactured by the method of the invention can be advantageously used as a fatigue relevant component in an automotive car body, such as a chassis-part, control arm or a shock absorber. The component can be also used as a crash relevant, safety component in an automotive car body, such as a bumper, a crashbox, a cross member, a pillar and a channel. As one solution the component manufactured by the method of the invention can be used as a hydroformed part in transport applications with locally annealed properties like a hydroformed A-pillar tube. Further, the component can be used as a complex, thin or multi-forming-step part in an automotive car body such as a strut dome, a wheelhouse or a back-seat-structure and, still, as crimping and feather edged parts. In addition thereto, the component can be used as formed sheets, tubes or profiles in building and steel constructions with local different mechanical-technological properties by annealing after forming the component.

BRIEF DESCRIPTION OF THE DRAWINGS

The invention is described in more detail referring to the attached drawings, where FIG. 3 shows an A-pillar to be heat treated according to the invention, FIG. 4 shows the A-pillar of FIG. 4 as a desired embodiment of the invention after the heat treatment according to the invention, and FIG. 5 shows the hardness in the embodiment of FIGS. 3 and 4.

DESCRIPTION OF THE INVENTION

Figure 1:
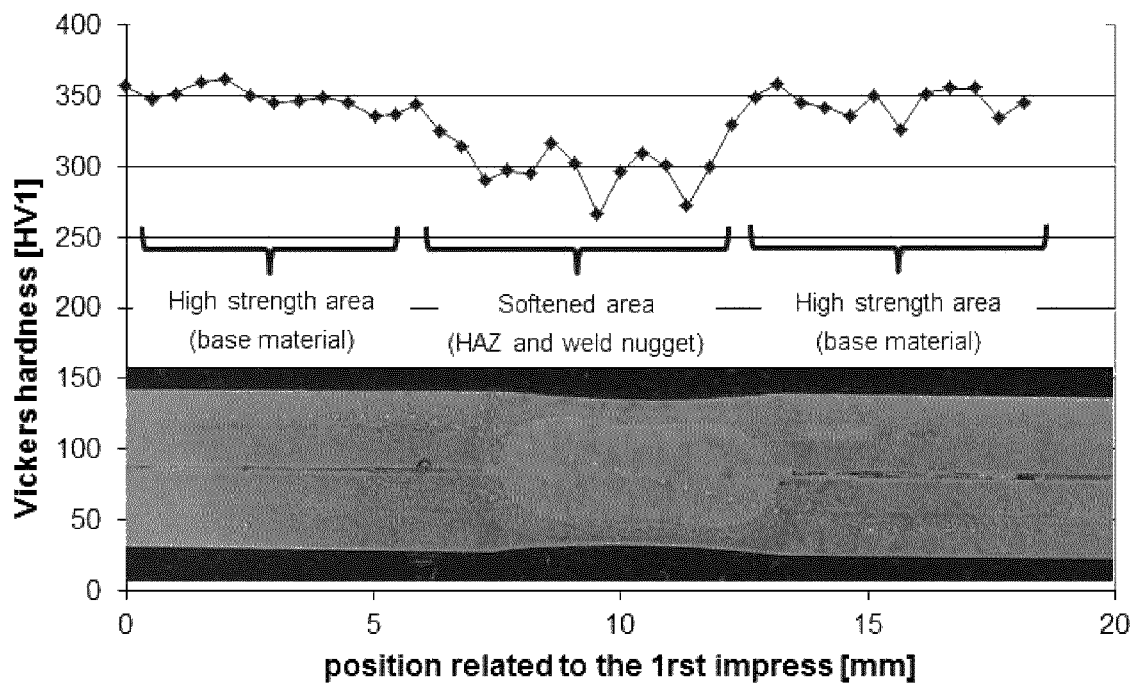
FIG. 1 shows measurement results for a component manufactured by the method of the invention.

In FIG. 1 a heat input for annealing a part of a component at the temperature over 900° C. is carried out in connection with spot welding of two parts of the component. The annealing leads to a decrease of the high strength material in the heat input area which is shown in FIG. 1 by the markings "HAZ" (Heat Affecting Zone) and "Weld nugget". This heat input area is softened by means of welding and has a high ductility with a high energy absorption potential.

Figure 2:
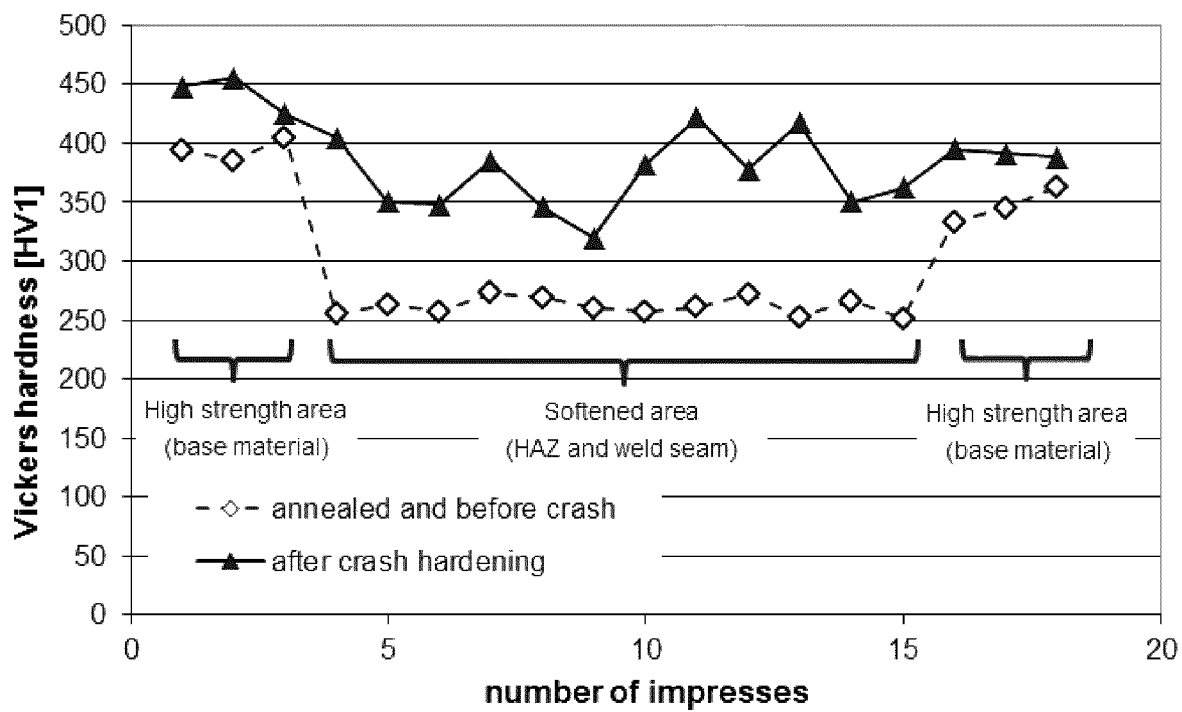
FIG. 2 shows measurement results for another component manufactured by the method of the invention.

In FIG. 2 a cap profile is manufactured out of an austenitic TWIP steel having the manganese content of 16 weight %. A softened area is consisting of the areas "HAZ" and "Weld seam" which are is achieved by welding with TIG. A crash forming is focused to the softened area with values: drop height=2.50 m, drop weight=57.90 kg and speed $v_0$=24.50 km/h. Hardness is measured in the surroundings of the welding area before (lower graph) and after a crash (upper graph). It is noticed that hardness of the cap profile is much higher after the crash forming.

FIG. 3 an A-pillar 1 to be used in an automotive car body is manufactured by hydroforming a tube which is made of austenitic TWIP steel. During hydroforming the A-pillar 1 has been work hardened and the hardness of the A-pillar is shown in FIG. 5 as "hydroformed tube". FIG. 4 shows the A-pillar 1 after a part 2 of the A-pillar has been heat treated according to the invention at areas where a higher energy absorption and a volitional intrusion is required. In FIG. 5 the wording "local annealed area" shows lower hardness values in the heat treated part 2 of the A-pillar 1.

The invention claimed is:

1. A method for manufacturing a component comprising:
providing a stainless steel material having an austenitic microstructure that has been cold work hardened in a first forming process and has a first ductility and a first strength; and
heat treating a localized area of the stainless steel material to create a localized softened area having a second ductility and a second strength,
wherein the second ductility is greater than the first ductility and the second strength is lower than the first strength, and
the component comprises the localized softened area having the second ductility and the second strength and a remainder having the first ductility and the first strength,
wherein the stainless steel material has a chromium content of 12-20 weight %, a manganese content of 15-20 weight %, and a nickel content of 4.0-9.5 weight %.

2. The method according to claim 1, wherein the stainless steel material has nitrogen and carbon contents with a sum (C+N) content of 0.4-0.8 weight %, and was work hardened by a twinning induced plasticity (TWIP) effect.

3. The method according to claim 1, wherein the stainless steel material was work hardened by a combination of twinning induced plasticity (TWIP) and transformation induced plasticity (TRIP) effects.

4. The method according to claim 1, wherein the stainless steel material was work hardened by a transformation induced plasticity (TRIP) effect.

5. The method according to claim 1, wherein the heat treatment is carried out by annealing at a temperature of 800-1250° C.

6. The method according to claim 5, wherein the annealing is combined with a subsequent cathodic dip coating hardening in a furnace at a temperature of 180-220° C.

7. The method according to claim 5, wherein the annealing is carried out by welding by a resistance, beam or arc welding process.

8. The method according to claim 5, wherein the annealing is carried out by inductive heating or by conductive heating.

9. The method according to claim 5, wherein the annealing is carried out in a heat treatment furnace during press hardening.

10. The method according to claim 5, wherein the annealing is carried out during laser or electron beam machining of the component.

11. The method according to claim 1, wherein the stainless steel material is provided in the shape of a sheet, coil, panel, plate, tube, profile, rivet or wire.

12. The method according to claim 1, wherein the component is a chassis-part, a control arm, a shock absorber, a bumper, a crashbox, a cross member, a pillar, a channel, a strut dome, a wheelhouse or a back-seat-structure for an automobile, or a hydroformed part for a transportation vehicle, or a sheet, tube, or profile for building construction.

13. The method according to claim 4, wherein the stainless steel material has a nickel content of 4.5-6.5 weight %.

14. The method according to claim 1, wherein the heat treatment is carried out by annealing at a temperature of 900-1150° C.

15. The method according to claim 1, wherein the stainless steel material has a chromium content of 14-16 weight %.

* * * * *